April 4, 1944.　　　　P. J. McLAREN　　　　2,345,944
CAM GEARING
Original Filed June 24, 1941　　2 Sheets-Sheet 1

Inventor:
PETER J. MCLAREN
By Moss & Nolte
Attorneys.

April 4, 1944. P. J. McLAREN 2,345,944
CAM GEARING
Original Filed June 24, 1941    2 Sheets-Sheet 2
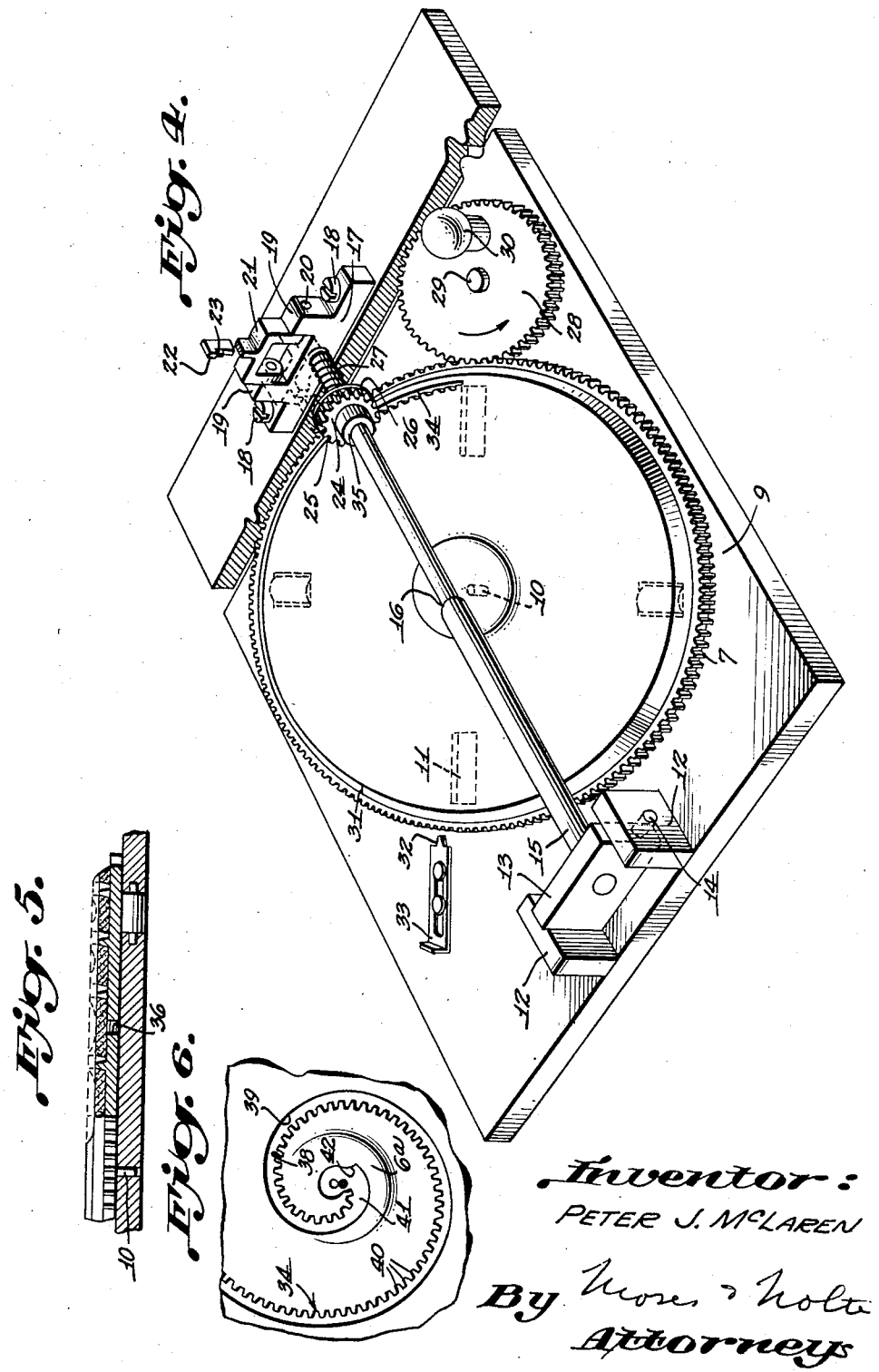
Inventor:
PETER J. McLAREN
By Moser & Holt
Attorneys Patented Apr. 4, 1944

2,345,944

UNITED STATES PATENT OFFICE 2,345,944

CAM GEARING

Peter J. McLaren, New York, N. Y., assignor, by mesne assignments, to Reconstruction Finance Corporation, New York, N. Y., a corporation of the United States Original application June 24, 1941, Serial No. 399,564. Divided and this application February 25, 1942, Serial No. 432,169

10 Claims. (Cl. 74—424.5)

This invention relates to spiral cam gears and more especially to a means and method providing for the guiding of a follower gear so that the follower gear teeth are caused to mesh properly with the several teeth of the cam gear. It has been the practice heretofore in using such gears to provide a yoke which embraces a portion of the row of spirally arranged teeth and which is slidable along a guide shaft, the yoke serving to hold the follower gear in proper mesh with said teeth. Difficulty is had in using this type of arrangement for guiding the follower gear in securing proper mesh between the gears, particularly at the inner extremity of the cam gear. It is a main object of the present invention to provide an arrangement whereby this difficulty is avoided and which avoids the necessity of providing an accessory guiding device for the follower gear, such as the yoke above mentioned.

Another object of the invention lies in the provision of a cam track for guiding the follower gear of a spiral cam gear and which may be readily and quickly molded so that it is inexpensive to manufacture while at the same time it is very strong and sturdy.

In one embodiment of the invention, the cam track is molded directly in a layer of soft plastic material which is itself used after suitable hardening as a cam track for guiding a follower gear. Or, the cam track of plastic material may, after its formation, be used as a mold to form a female master mold which may then be used to cast a cam track of identical shape to the original male mold in plastic material in a harder material such as bronze, aluminum or other suitable metal.

In the illustrated embodiment of the invention, the operation of molding the plastic material to form a cam track is commenced at the outer end of the cam track by impressing a flanged molding gear, similar to the follower gear to be later driven by the cam gear, into the plastic material. The apparatus for effecting this molding operation and the method of molding the cam track are claimed in patent application Serial No. 399,564 filed in my name on June 24, 1941, and of which this application is a division.

Further objects of the invention will become apparent to those skilled in the art as the description thereof proceeds. For a better understanding of the invention reference is made to the accompanying drawings, in which:

Fig. 4 is a perspective view of a device for forming a guide cam embodying the invention;

Fig. 5 is a fragmentary sectional view showing a portion of the device of Fig. 4 and of the cam track formed thereon; and Fig. 6 is a top plan view showing the center portion of a cam gear formed on the device shown in Fig. 4 and of its supporting plate.

Figure 1:
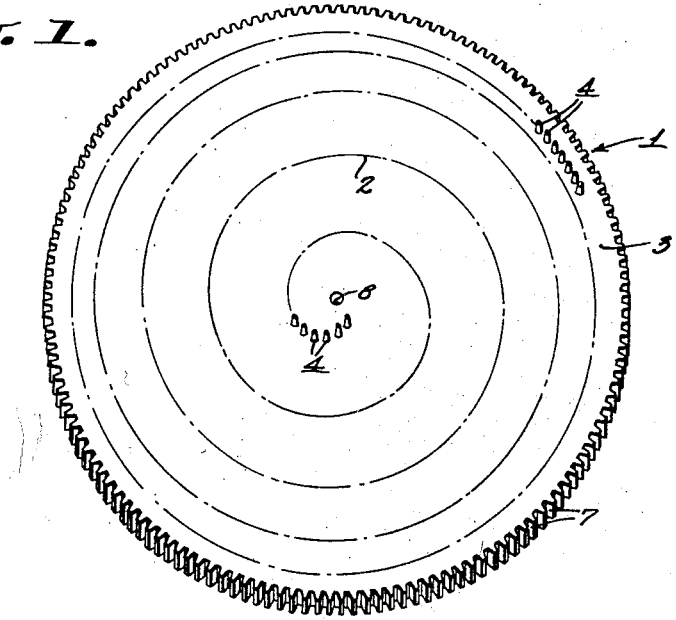
Fig. 1 is a perspective view of a pin cam gear and its supporting plate.
Figure 2:
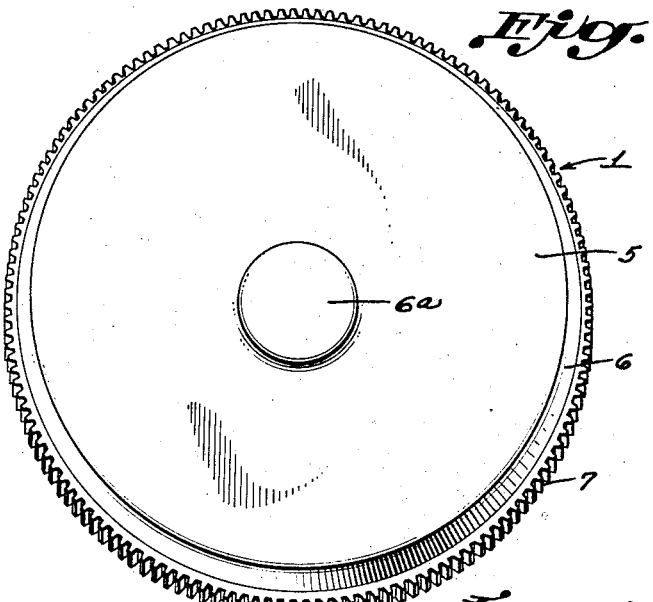
Fig. 2 is a perspective view of the pin cam gear and plate of Fig. 1 covered with a layer of plastic material.
Figure 3:
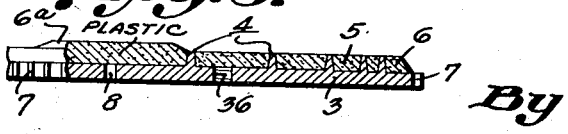
Fig. 3 is a fragmentary sectional view showing a portion of the pin cam gear of Fig. 2 and its supporting plate.

Referring to Figs. 1 to 3, an embodiment of the invention is shown in connection with a spiral cam gear 1 which is formed by plotting a spiral shaped curve 2 of the desired shape on a supporting metal base plate 3, drilling a series of holes at suitably spaced apart points along the spiral curve 2 and driving metal pins 4 into such holes, the portions of the pins which extend from the upper surface of the plate 3 being tapered, as shown, to provide pin gear teeth for meshing with a follower gear. The cam gear 1 is herein illustrated as a cosine gear, being shaped to secure a versedsine output from its follower gear, as disclosed in connection with Figs. 19 to 22 of United States Patent No. 2,273,652, granted February 17, 1942, in the names of William L. Maxson and Peter J. McLaren. It will be understood, however, that the invention is not limited to cam gears of this particular shape, but is adapted for use with cam gears of different shapes. A layer 5 of suitable plastic material which is soft enough to receive the impression of the follower gear teeth, and which may later be hardened in a suitable manner, depending on the composition of the plastic material, is spread over the upper surface of the plate 3. The plastic material may be applied manually, as with a spatula or similar instrument and its upper surface smoothed off at a level with the top of the pins 4. The plastic should be tapered off at the periphery as indicated at 6. In the preferred form of the invention, the layer of plastic material is made somewhat thicker in the region around the center of the cam gear, as indicated at 6a in Fig. 3, for a purpose to be later described. Care should be taken to insure that the tapered portion 6 allows adequate material beyond the outermost pins to allow the formation of a proper cam track therein while at the same time it should not extend so far outwardly as to interfere with or clog the gear teeth 7 which are formed on the periphery of the cam plate 3. The base plate 3 is provided at the center of the gear 7 with a cylindrical bore 8 for a purpose to be later described.

The cam plate, prepared as heretofore described, is placed in a fixture of the type shown in Fig. 4 which comprises a supporting base 9 from which projects a pivot pin 10 adapted to enter the bore 8 and provide an axis of rotation for the plate 3 and its cam 1. A plurality of spaced supporting rollers 11 are mounted in the base 9 to provide an adequate means for rotatably supporting the plate 3 and to prevent it from tilting. Secured to the base 9 near one end thereof is a pair of supporting brackets 12 between which is disposed a shaft supporting block 13 pivotally mounted on a pair of pivot pins 14 journaled in the brackets 12, only one of the pins 14 being shown. Secured firmly to the block 13 is a shaft 15 which is provided at the proper position thereon with a shoulder 16, the opposite end of the shaft 15 having secured firmly thereto a shaft supporting block 17 adapted to be releasably secured to the base 9 by the securing screws 18. The block 17 is provided with a pair of upstanding lugs 19 between which is pivotally supported, as at 20, a follower gear indexing member 21, illustrated as being in the form of a hook and having at its end a downwardly depending hook portion 22 and at an intermediate point thereon a downwardly projecting locating tooth 23.

Mounted for free rotation on the shaft 15 is a follower gear 24, the gear teeth 25 of which are of the proper shape and pitch to properly mesh with the pins 4 of the cam gear 1, the follower gear having secured to the outer end thereof a thin flange 26 whose diameter is preferably the same as that of the gear 24. A spiral compression spring 27 surrounds the outer end of the shaft 15, one end of the spring bearing against the supporting block 17 and its inner end bearing against the flange 26. For rotating the plate 3 and the spiral cam gear 1, a gear 28 is provided which is rotatably supported on a stub shaft 29 carried by the base plate 9. Any suitable means, such as a handle 30, may be provided for manually rotating the gear 28.

In using the device to form a cam track for the follower gear 24, the screws 18 having been withdrawn, the follower gear 24 is pushed outwardly along the shaft 15 against the bias of the spring 27 and the indexing lever 21 lowered into the dotted position shown, so that its hook 22 engages the inner face of the gear 24 and holds the latter against the bias of the spring 27. Simultaneously with the lowering of the hook 22, the tooth 23 will engage between two of the gear teeth 25 and rotate the follower gear 24 in one direction or the other on the shaft 15 to bring it into proper position, should it not already be in such position, as to mesh properly with the outermost pins of the cam gear 1. The shaft 15, gear 24 and block 17 are then raised as a unit about the pivot pins 14 into a substantially vertical position. The plate 3, coated with plastic material as above described, is then placed in position on its pivotal support 10 and the gear 28 then rotated until an indicator 31 mounted on the upper surface of plate 3 between two of its teeth 7 comes opposite a pawl 32 formed at the inner end of a slide 33 mounted on the base 9. The pawl is then pushed inwardly to lock the cam plate 3 in position while the impression of the outer end of the cam track in the plastic material 5 is commenced. This is then effected by lowering the block 17 and shaft 15 as a unit into the horizontal position shown in Fig. 4. The screws 18 are then tightened until the block 17 comes to rest on the base plate 9 so that an impression is made in the plastic material by the lower portion of flange 26 and gear 24, which is now in proper mesh with the outermost cam pins 4.

The slide 33 is then moved to withdraw the pawl 32 from between the gear teeth 7 and the indexing lever 21 raised into the full line position shown. Rotation of the handle 30 and gear 28 in the direction shown by the arrow will then cause a spirally shaped cam track 34 to be molded or impressed in the plastic material 5, the spring 27 serving to maintain the flange 26 pressed against the outer edges of successive cam pins 4 as the follower gear 24 rotates so that its teeth 25 are maintained in proper meshing engagement with the cam pins 4. Rotation of the handle 30 is continued until the hub 35 of gear 24 comes into engagement with the shoulder 16 of shaft 15, at which time the rotation of gear 24 is arrested when it is in engagement with the innermost pin 4 of the spiral cam 1.

The molding of the cam track is now completed and the screws 18 may now be withdrawn, the shaft 15 with its attached block 17 raised and the cam plate 3 removed from the fixture after which the plastic material 5 with the cam track 34 molded therein is permitted to harden. The hardening operation will obviously depend on the nature of the specific plastic material used, mere drying at normal room temperature being sufficient to effect the hardening with certain plastic materials to be described. It is desirable that the major portion of the top surface of the cam track 34 should be substantially in the same plane with the top of the cam pins 4. Means is, therefore, provided in the form of a plurality of holes 36 which are tapped into the lower portion of plate 3 whereby the plate 3 may be secured in a lathe, grinding machine or other device wherein the excess material which has been displaced above the general level of the plastic material 5, as indicated at 37 in Fig. 5 by the dotted lines shown, may be removed. The thicker plastic material at the center of the cam gear, as indicated at 6a in Figs. 3 and 6, is preferably not removed but is left at the thickness produced by the molding operation. After the cam track 34 has been completed in the manner described, it may be used to guide a follower gear similar to the gear 24 and which may be provided with a flange similar to the flange 26, along the spiral track to secure proper meshing of the gears at all times. Or, the cam track 34 made as above described, may be reproduced in a harder material such as bronze, aluminum or other metal alloy by a suitable molding or die casting operation in any known manner.

The cam track 34 (Fig. 6) consists of spaced inner and outer walls 38 and 39, the inner wall 38 having gear teeth 40 molded therein, which teeth are generated or formed by the teeth of the gear 24. The outer wall 39 of the cam track is formed by the flange 26 and throughout the major portion of the cam track the spacing between the walls 38 and 39 is substantially uniform, as illustrated in Fig. 6. The curvature at the inner end of the spiral cam 1, however, changes very rapidly and since the plane of the gear 24 is substantially tangent to the cam curve at all points therealong, it results that at the center portion of the gear, the flange 26 molds the plastic material into such shape that the slope or steepness of the cam wall 39 decreases toward the inner end of the cam gear. This results in a gradual increase in the spacing between the walls 38 and 39 of the cam track as the inner end thereof is approached, as illustrated in Fig. 6 at 41. The outer face of the flange 26 forms a shoulder 42 in the plastic material, which terminates the inner end of the cam track when the gear 24 is in engagement with the innermost cam pin 4.

Since the bottom of the outer cam wall 39 at the center of the gear is tangent to the bottom of the flange 26, this portion of the cam wall is not effective in urging the follower gear inwardly toward the center of the cam gear. The top portion of wall 39 is steeper, however, and since this portion of the wall engages the flange 26 to bias the follower gear inwardly, the component of force generated for guiding the follower gear inwardly may be increased by making the cam wall 39 higher. This desirable result may be readily accomplished in the manner above indicated; namely, by making the plastic layer 5 somewhat thicker in the region about the inner end of the cam gear.

Any suitable plastic material may be used for molding the cam track therein. A convenient material is one used by dentists for taking dental impressions and is known under the trade name "Mizzy Low Heat Compound." This material is a wax which may be softened to render it plastic by heating it to 125° F., as by immersing it in warm water, just before use. After the cam track has been formed therein, it is only necessary to allow the material to cool to normal room temperature whereupon it becomes hard and stable. Or other dental waxes sold under different trade names may be used, as may also beeswax or paraffin. Other suitable plastic materials which may be used are modeling clay, pottery clay, common plaster, plaster of Paris, fine molding sand, soap, tar, putty, chicle or thermoplastic materials of which "amphenol" is an example. Or liquid rubber, which has been applied to the plate 3 in several thin layers and allowed to harden slightly before the impression is made, is satisfactory. Also certain gelatinous materials, of which agar-agar is an example, may be used by heating such materials to a suitable degree before the cam track is molded and cooling them shortly thereafter.

I have described what I believe to be the best embodiments of my invention. I do not wish, however, to be confined to the embodiments shown, but what I desire to cover by Letters Patent is set forth in the appended claims.

I claim:

1. In a device of the class described, the combination of a cam gear having a continuous series of gear teeth arranged in a plural turn flat spiral path, the curvature of the spiral progressively changing throughout the full length of the spiral path, said cam gear including a cam track defined jointly by the cam gear teeth and by a spaced wall portion integral with the cam gear teeth and disposed alongside the teeth, the distance between the tips of teeth of the cam gear and the top portion of said wall increasing with increase of curvature of the spiral, and a follower gear, said cam track being disposed to maintain the teeth of the follower gear in proper meshing engagement with those of the cam gear throughout the full length of the cam gear.

2. The combination as claimed in claim 1 in which the spiral cam track is formed of plastic material.

3. The combination as claimed in claim 1 in which the spiral cam track is formed of thermoplastic material.

4. In a device of the class described, the combination of a cam gear having a continuous series of gear teeth arranged in a plural turn flat spiral path, each of said gear teeth comprising a pin formed of hard material and a pin-enclosing, tooth-defining layer of plastic material, said cam gear including a cam track defined jointly by the cam gear teeth and by a spaced wall portion integral with the plastic material of the cam gear teeth and disposed alongside the teeth, a follower gear adapted to mesh with the cam gear and having at one end thereof a thin flange adapted to engage said pins in succession, said track arranged to maintain the follower gear in proper meshing engagement with the cam gear.

5. The combination as set forth in claim 4 in which the cam track is formed of a substance selected from the group consisting of wax, clay, plaster, molding sand, rubber, agar-agar, soap, tar, putty and chicle.

6. In a device of the class described, the combination of a toothed cam gear of varying radius, and a follower gear adapted to mesh with the cam gear teeth, said cam gear including a cam track defined jointly by the cam gear teeth and by a spaced wall portion integral with the cam gear teeth and disposed alongside the teeth, said track arranged to maintain the follower gear in meshing engagement with the cam gear teeth, said cam track being of substantially uniform thickness throughout the major portion thereof and of somewhat greater thickness at the inner end portion thereof.

7. In a device of the class described, the combination of a cam gear having teeth arranged in a flat spiral path and extending through more than 720 degrees, a follower gear adapted to mesh with the cam gear teeth, said cam gear including a cam track defined jointly by the cam gear teeth and by a spaced wall portion integral with the cam gear teeth and disposed alongside the teeth, said track arranged to maintain the follower gear in meshing engagement with the cam gear teeth, said wall being spaced outward from the tips of the teeth by a substantially uniform amount throughout the major portion of the track and with the spacing between the tooth tips and the top portion of the outer wall gradually increasing toward the inner end of the cam track.

8. A gearing device as claimed in claim 7 in which the outer wall of the cam track at the inner end thereof is provided with a shoulder adapted to be engaged by the follower gear so as to limit the inward movement thereof along the cam gear.

9. In a device of the class described, the combination of a follower gear having a thin continuous flange at the outer side of the gear of the same diameter as the outside tooth diameter of the follower gear and a cam gear having teeth arranged in a flat spiral path and extending through more than 720 degrees said cam gear including a cam track defined jointly by the cam gear teeth and by a spaced wall portion integral with the cam gear teeth and disposed alongside the teeth, said track arranged to maintain the follower gear in meshing engagement with the cam gear, said wall being spaced outward from the tips of the teeth and shaped to provide continuous engagement with the said follower gear flange throughout the full range of movement of the follower gear along the cam gear.

10. A cam gear having teeth arranged in a flat spiral path, and a spiral guide wall integral with the teeth and spaced from the teeth, the exposed side of said wall being substantially coplanar with the exposed sides of said teeth throughout the major portion of the length of the path.

PETER J. McLAREN.